United States Patent [19]
Harriman et al.

[11] Patent Number: 6,092,158
[45] Date of Patent: Jul. 18, 2000

[54] METHOD AND APPARATUS FOR ARBITRATING BETWEEN COMMAND STREAMS

[75] Inventors: David J. Harriman, Sacramento; Brian K. Langendorf, El Dorado Hills; Jasmin Ajanovic, Folsom, all of Calif.

[73] Assignee: Intel Corporation, Santa Clara, Calif.

[21] Appl. No.: 08/874,414

[22] Filed: Jun. 13, 1997

[51] Int. Cl.[7] .............................. G06F 12/00; G06F 13/00
[52] U.S. Cl. ........................ 711/151; 711/154; 711/158; 710/240
[58] Field of Search .................................... 711/152, 154, 711/151, 158, 153; 395/673, 288, 292, 726, 728; 709/102, 103; 710/240, 200, 112

[56] References Cited

U.S. PATENT DOCUMENTS

| | | | |
|---|---|---|---|
| 5,379,379 | 1/1995 | Becker et al. | 395/250 |
| 5,524,235 | 6/1996 | Larson et al. | 711/151 |
| 5,553,268 | 9/1996 | Willenz et al. | 711/158 |
| 5,638,534 | 6/1997 | Mote, Jr. | 395/485 |
| 5,649,157 | 7/1997 | Williams | 395/478 |
| 5,765,189 | 6/1998 | Treiber et al. | 711/117 |
| 5,809,278 | 9/1998 | Watanabe et al. | 711/150 |
| 5,870,625 | 2/1999 | Chan et al. | 710/5 |
| 5,904,732 | 5/1999 | Greenley et al. | 710/57 |
| 5,905,897 | 5/1999 | Chou et al. | 710/260 |
| 5,906,000 | 5/1999 | Abe et al. | 711/151 |
| 5,911,051 | 6/1999 | Carson et al. | 710/107 |
| 5,946,466 | 8/1999 | Adiga et al. | 709/231 |

OTHER PUBLICATIONS

Intel Corporation, Accelerated Graphics Port Interface Specification, revision 1.0, pp. ii–x and 1–112, Jul. 31, 1996.

*Primary Examiner*—John W. Cabeca
*Assistant Examiner*—Pierre-Michel Bataille
*Attorney, Agent, or Firm*—Jeffrey S. Draeger

[57] ABSTRACT

A method and apparatus for arbitrating between command streams. The method unblocks high priority commands which are blocked and then selects any remaining high priority commands. Normal priority commands are selected after the high priority commands. A memory controller described includes a command queue block having a plurality of command queues, each being coupled to receive a different type of command. The memory controller also includes arbitration logic which, among other things, selects high priority read commands before high priority write commands. Memory interface logic generates memory accesses performing commands selected by the arbitration logic.

19 Claims, 5 Drawing Sheets

METHOD AND APPARATUS FOR ARBITRATING BETWEEN COMMAND STREAMS

BACKGROUND OF THE INVENTION

1. Field of the Invention

The present invention pertains to the field of computer systems. More particularly, the present invention pertains to the field of prioritizing transfers of data between a bus agent and a memory circuit in a computer system.

2. Art Background

Decreasing memory access latencies in a computer system is one technique which generally improves overall system performance. Since computer systems often sequentially access consecutive memory locations, memory systems are frequently structured to provide lowest access times when such sequential access occurs. This may be accomplished, for example, by alternating between memory banks (one or more memory chips which reference a fixed amount of data such as a byte, word, or quadword) such that no bank is accessed two bus cycles in a row. Such bank switching affords each memory bank additional time to prepare for the next access cycle.

Additionally, improving overall locality of reference often increases memory access efficiency. Accesses to memory locations in close proximity are likely to remain within the same page or other similar memory structure. Additionally, accessing the same memory structure is often preferred because the memory interface is often optimized for accesses within that same memory structure. For example, in a paged memory system, accesses to the same page may allow a row address strobe (RAS) signal to remain active while the column address (CAS) is varied. Thus, efficiencies can result from both sequential and proximate (e.g., within the same page) memory accesses.

Separation of read and write accesses is another optimization which may advantageously reduce overall memory access times. Often, a bus agent such as a microprocessor posts write cycles to write buffers so long as no data conflict exists. Such reordering improves performance by deferring write access (if possible) until the bus is available. Grouping reads and writes may also reduce "turn around", the switching from reads to writes (or writes to reads) which is typically less efficient than repeating the same type of command.

One memory access protocol which provides several memory access commands is described in the Accelerated Graphics Port (A.G.P.) Interface Specification, Revision 1.0, Jul. 31, 1996, available from Intel Corporation of Santa Clara, Calif. This protocol defines a set of commands intended to provide a high bandwidth channel between a bus master (typically a graphics accelerator) and main memory. While the A.G.P. Specification provides command types, the implementation of memory controller arbitration and queuing logic are limited only by ordering rules and the latency targets chosen by the designer.

The A.G.P. Specification defines normal and high priority read and write commands of varying lengths. A set of commands of the same type may be referred to as a command stream. The high priority commands should be completed within the chosen maximum or guaranteed latency time, but each data stream need only be ordered with respect to itself. For example, high priority reads must remain in order only with respect to other high priority reads. Thus, within each priority, read data is returned to the bus master, and write data is written to memory in the order requested. Additionally, data transfers are "disconnected" from associated access requests, meaning that other A.G.P. request operations may separate an A.G.P. request and its associated data transfer. As is further described in the A.G.P. specification, a fence command, among other things, may be issued to guaranty the order of completion of normal priority commands if needed.

Thus, while the A.G.P. Specification facilitates high bandwidth communication between a bus master and memory by way of re-orderable multiple priority commands, it does not specify hardware structures or arbitration algorithms which may achieve specific latency goals. Available prior art memory access arbitration techniques do not adequately take advantage of sequential and proximate memory access techniques. Nor do prior art techniques provide an arbitration mechanism for re-orderable read and write commands which have multiple priorities.

SUMMARY

The present disclosure describes a method and apparatus for arbitrating between command streams. The method unblocks high priority commands which are blocked and then selects any remaining high priority commands. Normal priority commands are selected after the high priority commands. A memory controller described includes a command queue block having a plurality of command queues, each being coupled to receive a different type of command. The memory controller also includes arbitration logic which, among other things, selects high priority read commands before high priority write commands. Memory interface logic generates memory accesses performing commands selected by the arbitration logic.

BRIEF DESCRIPTION OF THE FIGURES

The present invention is illustrated by way of example and not limitation in the figures of the accompanying drawings.

DETAILED DESCRIPTION

The present invention provides a method and apparatus for arbitrating between command streams. In the following description, numerous specific details such as command priorities and types, queue arrangements, and system configurations are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

As will be further discussed below, the present invention provides an approach to arbitration between command streams for efficient memory access. The techniques described achieve targeted command latencies by favoring high priority commands, especially blocked high priority commands. Additionally, improving locality of reference by favoring same page reads may bolster efficiency, as may reducing turn around by preferring the same type of command as last selected.

Figure 1:
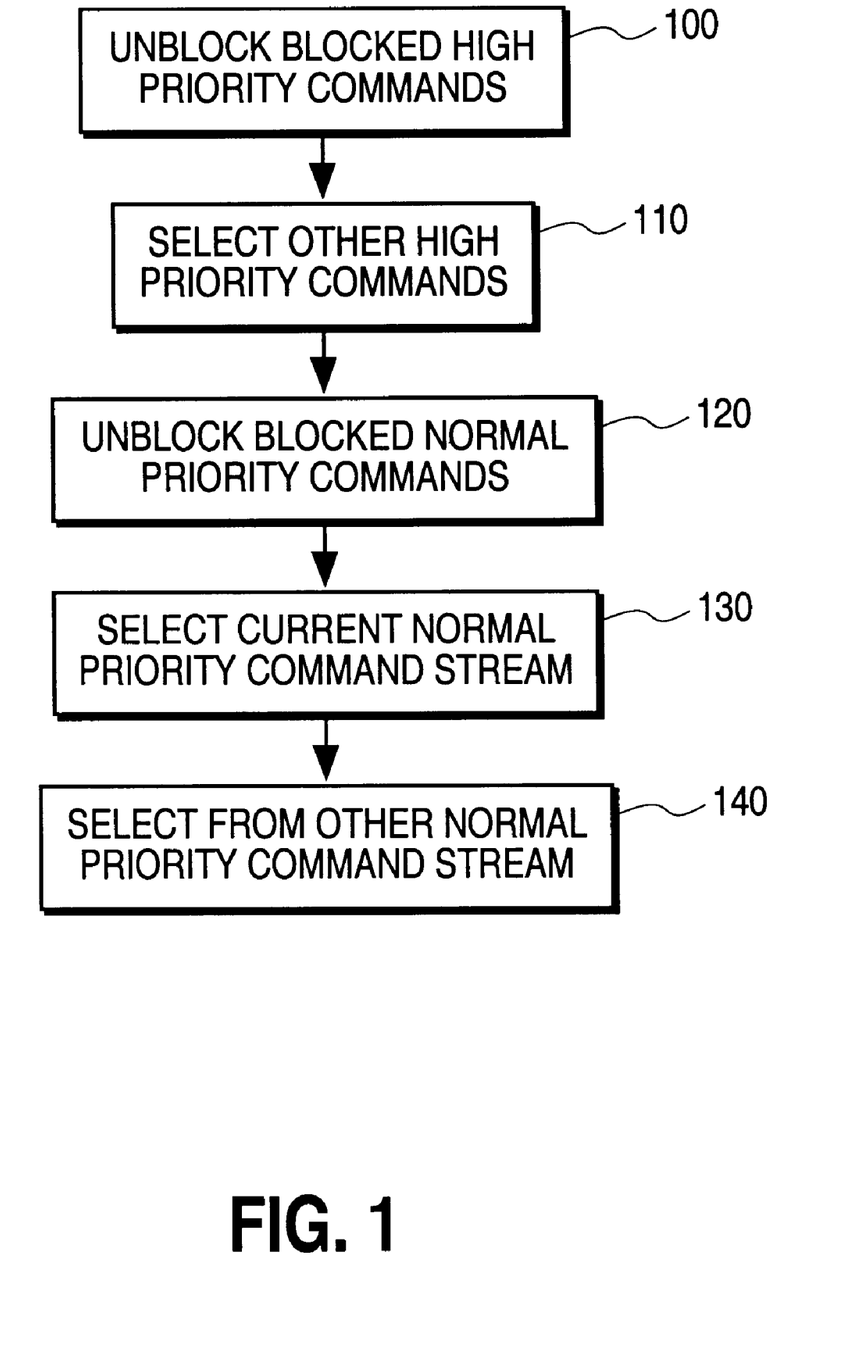
FIG. 1 illustrates one embodiment of a command arbitration algorithm of the present invention.
Figure 2:
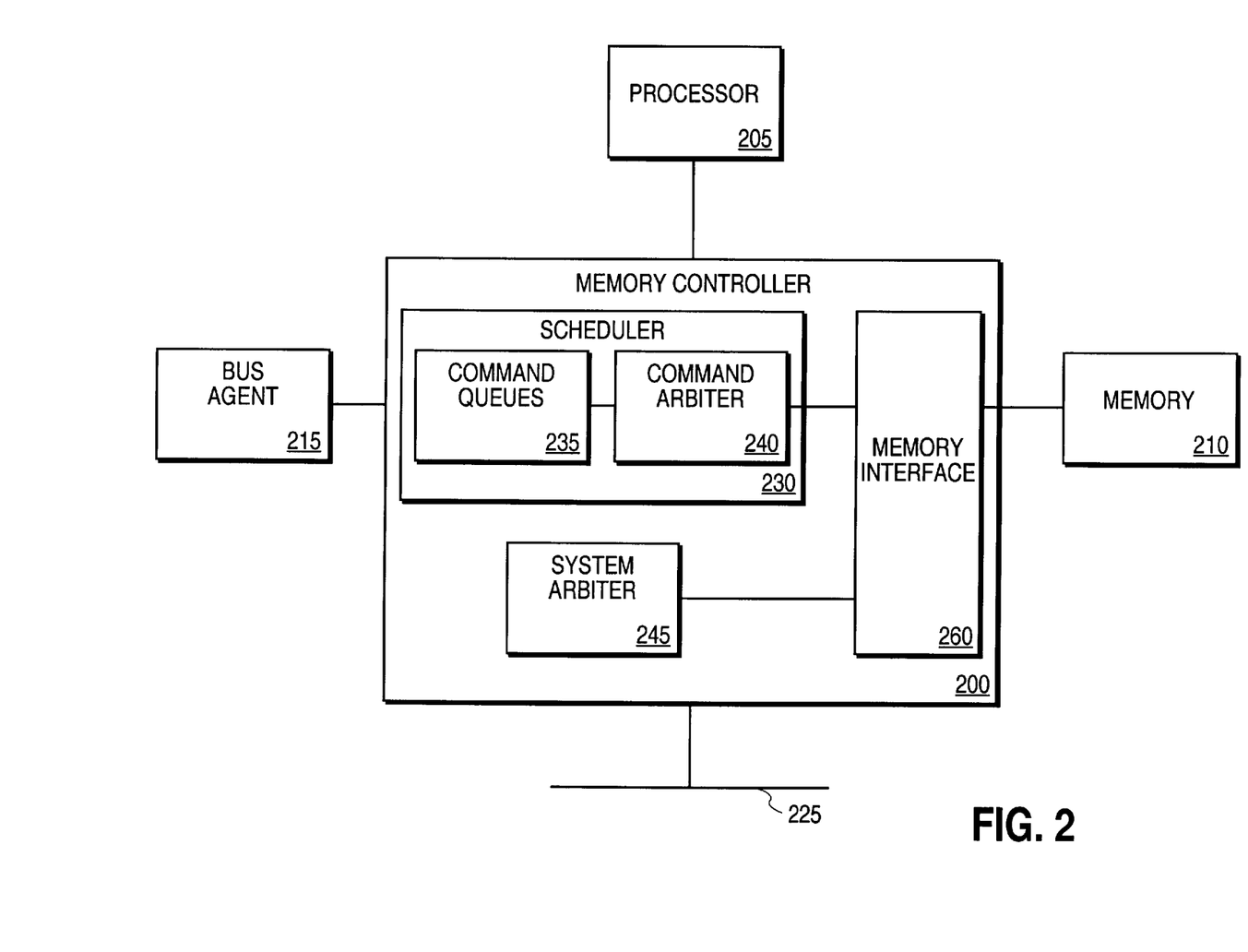
FIG. 2 illustrates one embodiment of a computer system of the present invention.

FIG. 1 illustrates one embodiment of a command arbitration algorithm which may be executed by a memory controller 200 illustrated in FIG. 2. The memory controller 200 provides a processor 205, a system bus 225, and a bus agent 215 access to a memory 210. In one embodiment, the memory 210 is a dynamic random access memory system; however, in alternate embodiments, the memory 210 may be mechanical storage such as a hard drive or other input/output device, or may be an abstract memory space including disk space, static and/or dynamic memory, and other memory devices. In one embodiment a system arbiter 245 handles a first type of command from the bus agent 215, the system bus 225, and the processor 205, while a scheduler 230 handles a second type of command from the bus agent 215. In alternate embodiments, the arbitration techniques described may be applied to all memory access commands. Additionally, the command arbitration algorithms discussed may be used in other system configurations which are known in the art.

As shown in step 100, a command arbiter 240 selects commands necessary to unblock any blocked high priority commands when a blocked command reaches the head of the command queues. A command becomes blocked when the memory controller 200 has insufficient resources to process data or a command from the bus agent 215 because all available buffering facilities are full. In this case, the command arbiter 240 dispatches to a memory interface circuit 260 at least enough commands to free buffering space for the blocked data. Blocked commands have elevated priorities because the bus agent 215 may be unable to perform other bus transactions while waiting for the memory controller 200 to accept the blocked command.

Commands selected by the command arbiter 240 are presented to the memory interface circuit 260 where they may also compete for access to the memory 210 with other commands from the processor 205 and the system bus 225. For example, in one embodiment, the bus agent 215 is a graphics accelerator which communicates with the memory controller 200 via the Accelerated Graphics Port (A.G.P.) protocol. In this embodiment, the system arbiter includes logic to interface with the processor 205, a second interface of the bus agent 215, and any Peripheral Components Interconnect (PCI) bus agents on the system bus 225. The second interface of the bus agent 215 may allow a separate type of transaction (e.g., a FRAME# based transaction) to configure and send certain commands to the bus agent 215. FRAME# based transactions are initiated using the well known FRAME# signal as opposed to using, for example, the PIPE# signal described in the A.G.P. Specification.

Each stage in the algorithm shown in FIG. 1 represents a level of precedence. Thus, the algorithm is restarted at step 100 after each command selection, and all blocked high priority commands are unblocked before other commands are selected. Other high priority commands are selected next as shown in step 110, thereby reducing the latency for high priority commands at the expense of normal priority latencies. Next, blocked normal priority commands are unblocked in step 120. This step is performed before other normal priority commands in order to free the bus agent 215 as quickly as possible.

As indicated by command queue block 235, several command queues are maintained by the scheduler 230. Typically, at least one high priority command queue and normal priority read and write command queues are maintained. In step 130, the command arbiter 240 selects the current normal priority command stream, meaning that the command arbiter 240 continues selecting normal priority commands based on the last type of command selected as long as there were no higher priority commands available (i.e., blocked or unblocked high priority commands or blocked normal priority commands). In an embodiment where the commands are separated into read and write command streams, turn around (switching from memory read to memory write accesses) is reduced by continuing the current command stream. In one embodiment, all commands are considered, such that interposed high priority commands may switch the stream considered to be the present normal priority stream. In alternate embodiments, the value considered to be the normal priority stream is unaffected by high priority commands.

If there are no commands remaining in the current command stream, step 140 is executed, and commands are selected from the other normal priority command stream. Step 140, however, is lowest in order of precedence, and is only reached if no high priority, blocked normal priority, or normal priority commands from the current stream are available. Additional rules could also complement this scheme at any level.

Figure 3:
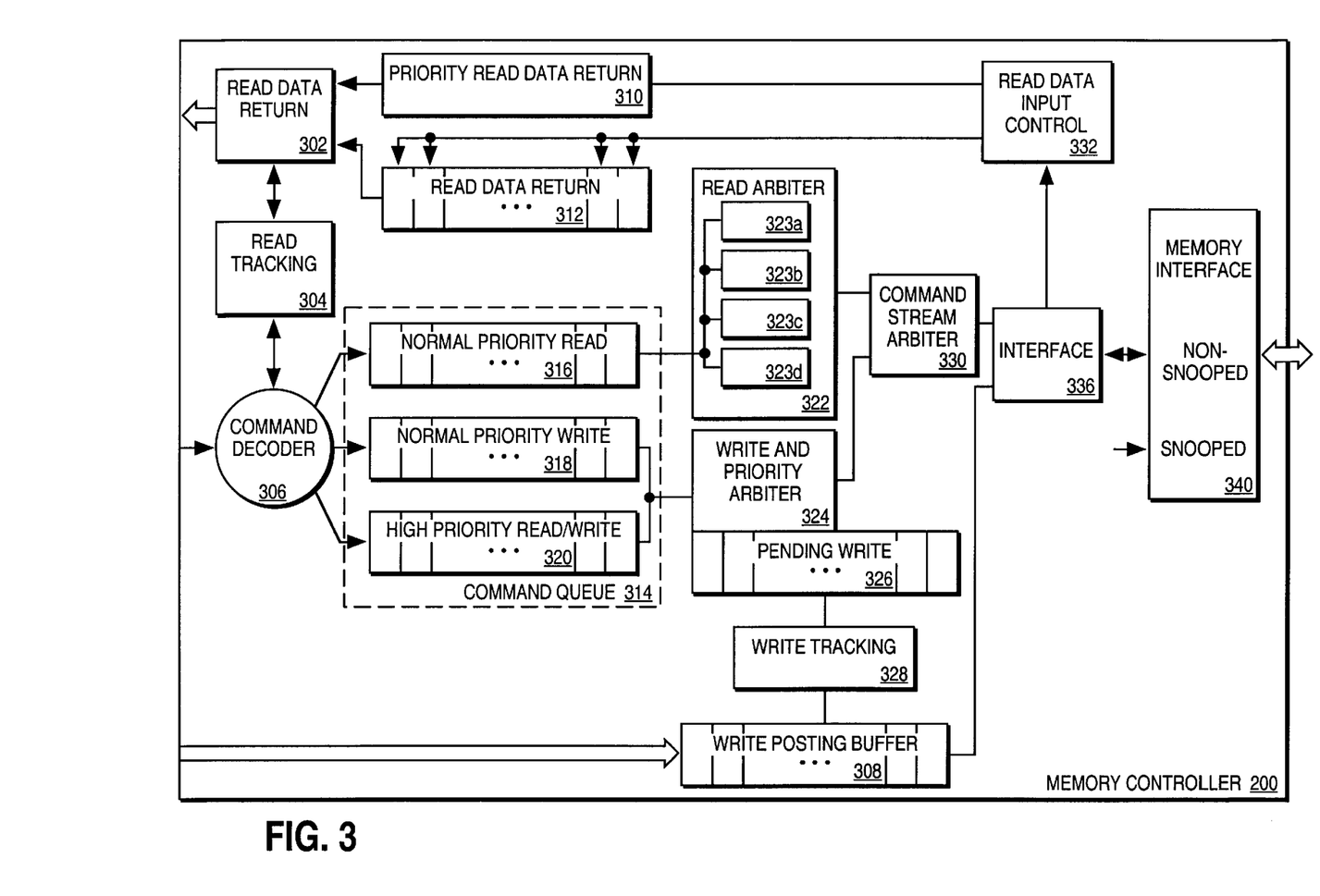
FIG. 3 illustrates one embodiment of a memory controller of the present invention.

This and other arbitration techniques described herein may be executed by the memory controller as shown in further detail in FIG. 3. The memory controller 200 includes a command decoder 306 which receives commands and decodes them for the command queue block 314. As illustrated, the command queue block has three separate command queues, a normal priority read queue 316, a normal priority write queue 318, and a high priority read and write queue 320.

Arbitration logic coupled to select commands from the command queue block includes a read arbiter 322, a write and priority arbiter 324, and a command stream arbiter 330. The read arbiter 322 includes four slots 323a–323d which may be used to reorder memory accesses to reduce page breaks or to optimize based on another criteria such as command age.

The write and priority arbiter 324 includes a pending write queue 326 which assures that the command stream arbiter 330 only selects write commands which have data available for execution. This additional circuitry is provided because a write command may be received by the command decoder 306 prior to the write data being received by a write posting buffer 308. The write and priority arbiter 324 communicates with the write posting buffer 308 through a write tracking circuit 328 in order to determine which writes are available for selection and execution.

The write tracking circuit 328 also helps detect blocked write commands by alerting the write and priority arbiter 324 if there is insufficient space in the pending write queue 326 or if there is insufficient space in the write posting buffer 308 for the data associated with a write command at the head of the normal priority write queue 318 or the high priority read and write queue 320. In that case, the write and priority arbiter 324 may raise the priority of at least one write command in the pending write queue 326 in order to make space in the write posting buffer 308 for the incoming data.

The write tracking circuit 328 ensures that the data from the write posting buffer 308 is passed along with the selected write command before the buffer location is overwritten with the incoming data.

The command stream arbiter 330 cooperates with the read arbiter 322 and the write and priority arbiter 324 to select a command for execution. All of the queues in the command queue block 314 may not be simultaneously accessible in this embodiment because the normal priority write and high priority read/write queues may share a read port. Nonetheless, multiple commands may still reach the command stream arbiter 330 and be available for execution in the same bus cycle. For example, the command stream arbiter 330 may need to choose between a normal priority read from the read arbiter 322, a high priority read available at the write and priority arbiter 324, and a high priority write also now available from the pending write queue 326 at the write and priority arbiter 324 because its associated data arrived at the write posting buffer 308.

The command stream arbiter 330 passes commands to an interface circuit 336 which transforms commands to a format recognized by a memory interface circuit 340. In one embodiment, the interface circuit 336 receives A.G.P. commands, and the memory interface circuit 340 provides a dynamic random access memory (DRAM) interface. The memory interface circuit 340 also receives other system memory access requests such as processor or PCI requests. The A.G.P. input port to the memory interface 340 is labeled non-snooped because A.G.P. memory accesses do not provide memory coherency checks with other system components. On the other hand, PCI and/or processor memory accesses may include such coherency checks and are received at the snooped input port of the memory interface 340.

The interface circuit 336 also returns data from the memory interface 340 to a read data input control block 332. High priority data is returned in order and placed in a priority read data return buffer 310. Normal priority read data, however, may be returned out of order. The return order may differ from the order in which commands are received if the read arbiter 322 alters the sequence of incoming reads prior to their execution. In this case, the read data input control block 332 places data in a particular location in a read data return buffer 312 such that the data reflects the original request order when the read data return buffer 312 fills. A read data return block 302 first selects priority read data from the priority read data return buffer 310 if available and subsequently returns the properly ordered normal priority read data to the requesting bus agent. Read tracking logic 304 tracks read commands from the time they reach the command decoder 306 until the time the requested data is returned by the read data return block 302.

Figure 4:
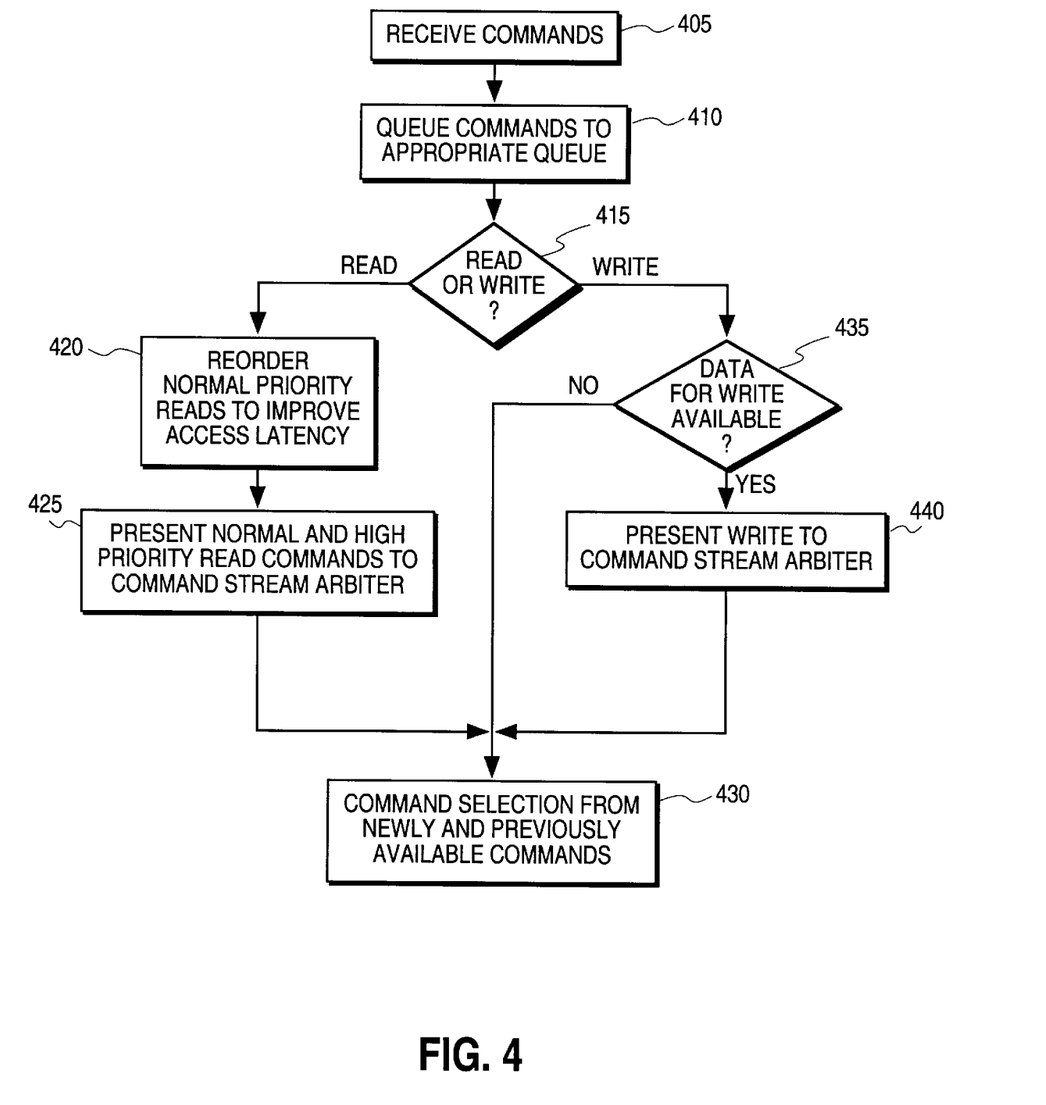
FIG. 4 is a flowchart illustrating steps performed by one embodiment of the present invention when commands are received.

FIG. 4 illustrates steps performed by one embodiment of the memory controller 200 starting when commands are received in step 405 by the command decoder 306. In one embodiment, receiving a high priority read command prevents the system arbiter 245 from initiating any FRAME# based transactions with the bus agent 215, thereby increasing the likelihood that the bus between the memory controller 200 and the bus agent 215 will be available when the high priority read data is returned. In step 410, commands are queued in the appropriate command queue. For embodiments processing A.G.P. transactions, command types are specified by four bits as defined in the A.G.P. Interface Specification.

As shown in step 415, read and write commands are treated differently. Write commands can not be selected and executed unless their data is available, whereas read commands may be executed immediately. Thus, as indicated in step 435, before a write is selected by the command stream arbiter 330, the write tracking circuit 328 must indicate to the write and priority arbiter 324 that the write data is available in the write posting buffer 308. If this data is available, the write command is presented to the command stream arbiter 330 as shown in step 440. Command selection from at least the previously available commands occurs whether or not the new write is available, as shown in step 430.

Read commands, on the other hand, are processed as shown in steps 420 and 425. Normal priority read commands are reordered in step 420 by the read arbiter 322 in order to improve access latency. The read arbiter 322 selects a read for presentation to the command stream arbiter based on the memory page accessed by the read, the relative age of the read, both, or some other criteria designed to improve access latency. Reordering at least partially based on page can help improve locality of reference and may lead to more efficient memory access.

High priority reads are not reordered but rather presented to the command stream arbiter in the order received. Thus, as shown in step 425, normal and high priority read commands are presented to the command stream arbiter. As previously mentioned, the command stream arbiter 330 selects from all presently available commands as shown in step 430.

Figure 5:
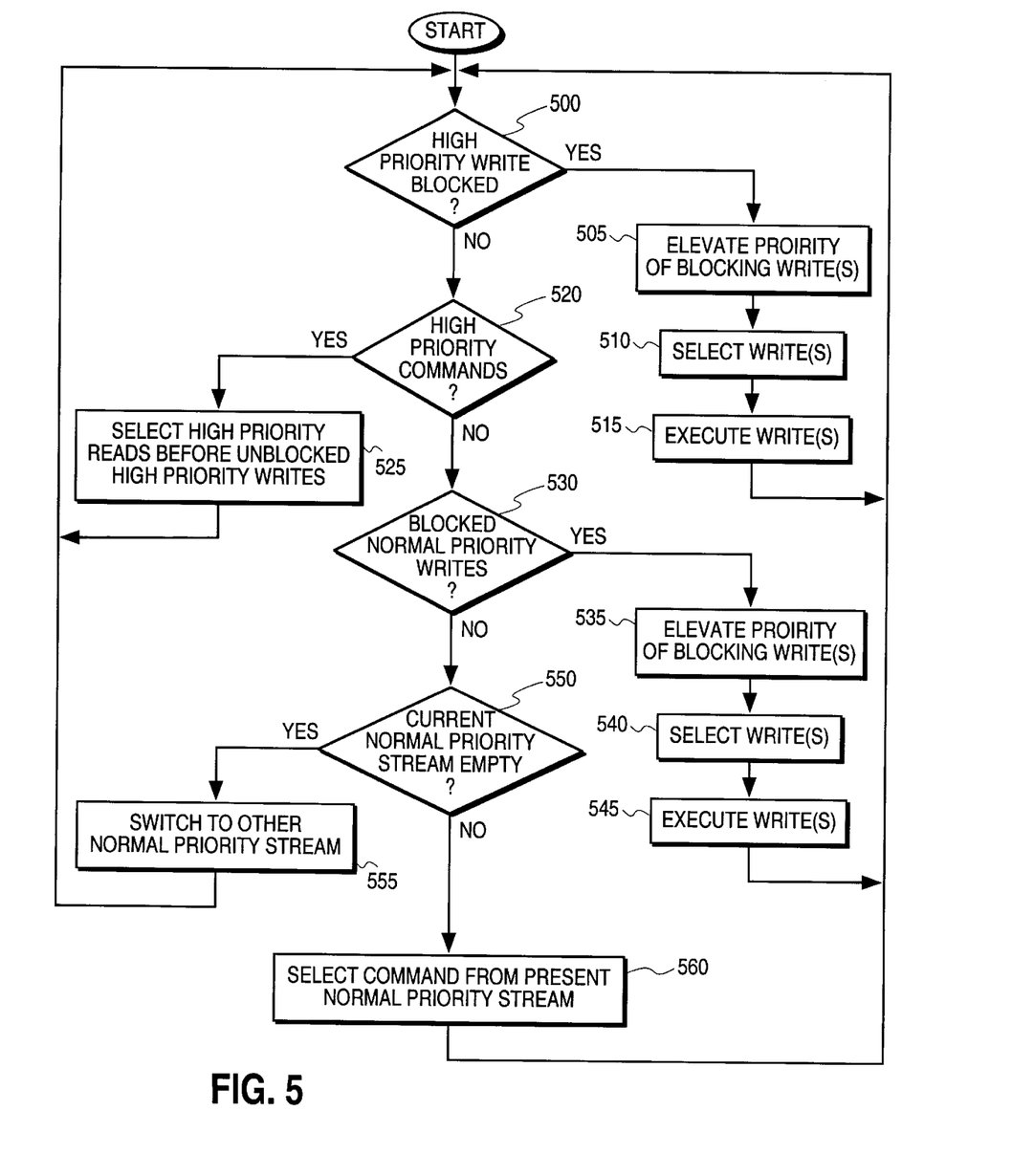
FIG. 5 is a flowchart illustrating the steps performed by one embodiment of the present invention when selecting a command for execution.

Details of the selection performed in step 430 for one embodiment of the memory controller 200 are illustrated in FIG. 5. In the embodiment of FIG. 3, the read arbiter 322 and the write and priority arbiter 324 both select highest priority commands and the command stream arbiter 330 then arbitrates between the separate command streams. Step 500 tests whether there is a blocked high priority write at the head of the high priority read and write queue 320. Such a command is given the highest level of precedence because the bus agent 215 may be unable to progress to the next phase of this transaction until data is accepted by the memory controller 200. Thus, the memory controller 200 elevates the priority of at least one blocking write as shown in step 505. The memory controller 200 may only elevate the priority of enough pending writes such that there is sufficient space in the write posting buffer 308 to buffer the high priority blocked write. Alternately, the memory controller 200 may elevate the priority of all pending writes such that the blocked write is executed along with any writes which were queued before it. In either case, at least enough writes are selected in step 510 and executed in step 515 to unblock the high priority write. Subsequently, the memory controller 200 returns to step 500 to again check if any high priority writes are blocked.

When there are no high priority writes which are blocked, the memory controller checks for other high priority commands as shown in step 520. If there are other high priority commands, step 525 selects reads before writes which, at this point, must be unblocked high priority writes. High priority reads are selected first because reads are uncompleted transactions of the bus agent 215 until data is returned. On the other hand, writes are complete for the bus agent 215 when the write data is buffered in the write posting buffer 308. Accordingly, high priority reads are preferred if available at the command stream arbiter 330 for execution during the same bus cycle as unblocked high priority writes are available. After step 525, the memory controller again returns to step 500.

If no high priority commands were available in step 520, blocked normal priority writes are next addressed as shown in step 530. Similarly to the case of blocked high priority writes, a blocked normal priority write detected at the head of the normal priority write queue 318 may be unblocked by elevating the priority of one or more blocking writes, selecting those writes, and executing them as shown in steps 535, 540, and 545. After unblocking any blocked normal priority writes, the memory controller 200 again returns to step 500.

If no blocked normal priority writes were detected in step 530, the memory controller 200 detects whether its current normal priority stream (i.e., reads or writes) is empty as shown in step 550. If that normal priority stream is not empty, a command is selected from that stream as shown in step 560. If the current normal priority stream is empty, the memory controller switches to the other normal priority stream as shown in step 555. This procedure helps to minimize turn around between read and write memory operations, reducing memory access overhead and improving performance.

Thus, the method and apparatus of the present invention provides for arbitrating between command streams to efficiently access memory. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A memory controller comprising:
    a command queue block having a plurality of command queues including a high priority queue, a normal priority read queue, and a normal priority write queue, each of said plurality of command queues being coupled to receive a different type of command with said high priority queue receiving both high priority read commands and high priority write commands;
    arbitration logic coupled to said command queue block to select an available high priority read before an available high priority write, wherein said available high priority write is selected after said available high priority read if said high priority write is an unblocked high priority write, and wherein said arbitration logic is coupled to unblock a blocked high priority write before selecting said available high priority read; and
    memory interface logic coupled to said arbitration logic to generate a memory access performing a selected command.

2. The memory controller of claim 1 wherein said arbitration logic comprises:
    a read arbiter coupled to reorder read commands from said normal priority read command queue;
    a write and priority arbiter coupled to select commands from said normal priority write command queue and said priority command queue; and
    a command stream arbiter coupled to select commands from said read arbiter and said write and priority arbiter.

3. The memory controller of claim 2 further comprising:
    a normal priority read data return buffer coupled to receive return data from a memory interface and to store said return data in one of a plurality of read data return slots; and
    a read data return circuit coupled to return data from said normal priority read data return buffer in a return order corresponding to a request order, said read data return circuit and said normal priority data return buffer thereby compensating for reordering performed by said read arbiter.

4. The memory controller of claim 3 further comprising:
    a high priority read data return buffer coupled to receive high priority read data and to provide said high priority read data to said read data return circuit.

5. The memory controller of claim 1 further comprising a write posting buffer, wherein said available high priority write comprises a high priority write having associated write data available at the write posting buffer for transfer by the memory interface circuit.

6. The memory controller of claim 5 wherein said available high priority read comprises a high priority read which is available from said command queue block to said arbitration logic.

7. The memory controller of claim 6 wherein said arbitration logic is further coupled to elevate a priority level of a pending write command having data queued in said write posting buffer and blocking said high priority write.

8. The memory controller of claim 6 further comprising posted write tracking logic coupled to the write posting buffer and the arbitration logic to track whether the write posting buffer is full.

9. A system comprising:
    a main memory;
    a bus agent configured to generate a plurality of commands to access said main memory;
    a processor; and
    a memory controller coupled to said processor, said main memory, and coupled to receive said plurality of commands from said bus agent, said memory controller including
        a normal priority read queue;
        a normal priority write queue;
        a high priority read and write queue;
    said memory controller to unblock high priority write commands from said bus agent by elevating a priority level for all write commands in either the normal priority write queue or the high priority read and write queue prior to a blocked high priority write command, and to select an available high priority read command over an available high priority write command unless said available high priority write command is a blocked high priority write command.

10. The system of claim 9 wherein said bus agent comprises a graphics accelerator.

11. A method of arbitrating between command streams, comprising:
    unblocking a blocked high priority command which is a high priority write command by
        elevating a priority level for any write commands which are queued prior to said blocked high priority write command,
        selecting said write commands which are queued prior to said blocked high priority write command;
    selecting any remaining high priority commands by:
        selecting first any high priority read commands;
        selecting second any unblocked high priority write commands; and
    selecting normal priority commands.

12. The method of claim 11 further comprising, before the first selecting step, the steps of:
    receiving a plurality of commands;

queuing said plurality of commands in a plurality of command queues; and presenting a subset of said plurality of commands to an arbiter as a plurality of available commands which may be selected for execution.

13. The method of claim 12 wherein said step of presenting further comprises the steps of:

presenting a read command to said arbiter if said read command is first in a read queue;

determining if data is available for a write command which is a part of said plurality of commands; and presenting said write command as one of said plurality of available commands if said data is available; and waiting until said data is available before presenting said write command as an available command if said data is unavailable.

14. A method of arbitrating between command streams, comprising:

unblocking a blocked high priority command which is a high priority write command by
elevating a priority level for any write commands which are queued prior to said blocked high priority write command,
selecting said write commands which are queued prior to said blocked high priority write command;

selecting any remaining high priority commands; and selecting normal priority commands by:
unblocking any blocked normal priority writes; and
selecting any remaining normal priority commands.

15. The method of claim 14 wherein the step of selecting any remaining normal priority commands comprises the steps of:

switching from a first normal priority stream to a second normal priority stream if said first normal priority stream is empty; and selecting a next command from said first normal priority stream if said first normal priority stream has at least one remaining entry.

16. The method of claim 15 wherein the step of unblocking any blocked normal priority writes further comprises the steps of:

elevating a priority level for at least one write command which is queued prior to a blocked normal priority write command; and selecting said at least one write command which is queued prior to said blocked normal priority write command.

17. A method of ordering commands which are received from a graphics accelerator and dispatched to a memory circuit, the method comprising the steps of:

receiving a plurality of read commands;

selecting at least one of said plurality of read commands;

receiving a plurality of write commands;

receiving a blocked write command which is blocked by said plurality of write commands by:
queuing a received write command in a queue; and
testing whether said received write command is blocked when said received write command reaches a head of said queue; and unblocking, prior to completing said plurality of read commands, said blocked write command by
elevating a priority level for any write commands which are queued prior to said blocked write command, and
selecting said write commands which are queued prior to said blocked write command.

18. A method of ordering commands which are received from a graphics accelerator and dispatched to a memory circuit, the method comprising:

receiving a plurality of read commands wherein said plurality of read commands are normal priority read commands;

selecting at least one of said plurality of read commands;

receiving a plurality of write commands;

receiving a blocked write command which is blocked by said plurality of write commands wherein said blocked write command is a high priority write command and unblocking, prior to completing said plurality of read commands, said blocked write command by
elevating a priority level for any write commands which are queued prior to said blocked write command, and selecting said write commands which are queued prior to said blocked write command.

19. The method of claim 8 further comprising the step of:

completing, prior to completing said plurality of read commands, at least one of said plurality of write commands.

* * * * *